US009718402B2

United States Patent
Smyth et al.

(10) Patent No.: US 9,718,402 B2
(45) Date of Patent: Aug. 1, 2017

(54) APPARATUS AND METHOD FOR ACTIVELY DETERMINING HEIGHT CLEARANCE AND GENERATING ALERTS

(71) Applicant: Ford Global Technologies, LLC, Dearborn, MI (US)

(72) Inventors: Cameron Smyth, Wyandotte, MI (US); Thomas Lee Miller, Ann Arbor, MI (US); Eric L. Reed, Livonia, MI (US); Robert Bruce Kleve, Ann Arbor, MI (US); Jacob Lucero, Dearborn Heights, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 82 days.

(21) Appl. No.: 14/681,436

(22) Filed: Apr. 8, 2015

(65) Prior Publication Data

US 2016/0297360 A1    Oct. 13, 2016

(51) Int. Cl.
*B60Q 9/00*    (2006.01)

(52) U.S. Cl.
CPC ..................... *B60Q 9/00* (2013.01)

(58) Field of Classification Search
CPC .. B60Q 1/525; B60Q 5/006; B60Q 9/002004; B60Q 9/006; B60Q 9/007; B60Q 9/008;
(Continued)

(56) References Cited

U.S. PATENT DOCUMENTS

| 4,916,429 A | 4/1990 | Hicks et al. |
| 4,994,971 A | 2/1991 | Poelstra |
(Continued)

FOREIGN PATENT DOCUMENTS

| DE | 2932118 A1 | 2/1981 |
| DE | 10351915 A1 | 6/2005 |
(Continued)

OTHER PUBLICATIONS http://theappgarden.co.uk/blog/business/beacons-ibeacons-detail/, "Beacons and iBeacons in Detail—The App Garden—UK Mobile App Developers", Oct. 2, 2014, 4 pages.
(Continued)

*Primary Examiner* — Joseph Feild
*Assistant Examiner* — Omar Casillashernandez
(74) *Attorney, Agent, or Firm* — Brooks Kushman P.C.; Jennifer M. Stec

(57) ABSTRACT

In at least one embodiment, an apparatus includes a controller coupled to a first sensor positioned on a first object external to a vehicle and configured to receive first information indicative of a height of the first object from the first sensor via Bluetooth Low Energy (BLE) and store second information corresponding to a height of the vehicle. The controller is further configured to receive third information corresponding to a height of overhead obstacle positioned external to the vehicle and to compare at least one of the first information and the second information to the third information. The controller is further configured to generate an alert based on the comparison of the at least one of the first information and the second information to the third information.

11 Claims, 8 Drawing Sheets

(58) Field of Classification Search
CPC . B60R 21/0134; G01S 13/931; G01S 17/936; G08G 1/16; G08G 1/165; G08G 1/166; G08G 1/167; G08G 1/168; B60W 30/08
USPC .................................................. 340/435, 436
See application file for complete search history.

(56) References Cited

U.S. PATENT DOCUMENTS

| | | | |
|---|---|---|---|
| 5,389,912 A | 2/1995 | Arvin | |
| 7,449,996 B2 | 11/2008 | Hill | |
| 7,688,187 B2 | 3/2010 | Caird et al. | |
| 7,761,227 B2 | 7/2010 | Kropp | |
| 8,354,920 B2 * | 1/2013 | Kole | G01C 5/00 180/167 |
| 8,624,715 B2 * | 1/2014 | Merritt | B62J 3/00 340/432 |
| 8,872,641 B2 * | 10/2014 | Sowa | G08G 1/095 340/425.5 |
| 2005/0012603 A1 | 1/2005 | Ewerhart et al. | |
| 2006/0015249 A1 | 1/2006 | Gieseke | |
| 2007/0103282 A1 * | 5/2007 | Caird | B60Q 9/00 340/435 |
| 2009/0284376 A1 * | 11/2009 | Byun | G06K 19/0717 340/572.1 |
| 2009/0315693 A1 | 12/2009 | Nugent | |
| 2010/0057353 A1 | 3/2010 | Friedman | |
| 2011/0105097 A1 | 5/2011 | Tadayon et al. | |
| 2011/0178705 A1 | 7/2011 | Pakzad et al. | |
| 2011/0301780 A1 | 12/2011 | Miller et al. | |
| 2012/0006610 A1 | 1/2012 | Wallace et al. | |
| 2012/0309410 A1 | 12/2012 | Marti et al. | |
| 2013/0017816 A1 | 1/2013 | Talty et al. | |
| 2013/0084847 A1 | 4/2013 | Tibbitts et al. | |
| 2013/0093583 A1 | 4/2013 | Shapiro | |
| 2013/0099910 A1 * | 4/2013 | Merritt | G01S 7/003 340/435 |
| 2013/0103305 A1 | 4/2013 | Becker et al. | |
| 2013/0110346 A1 * | 5/2013 | Huber | B60T 7/22 701/33.9 |
| 2014/0005875 A1 * | 1/2014 | Hartmann | G08G 1/16 701/23 |
| 2014/0303886 A1 | 10/2014 | Roemersperger et al. | |
| 2015/0066349 A1 * | 3/2015 | Chan | G01C 21/3407 701/400 |
| 2016/0049017 A1 * | 2/2016 | Busse | G07C 5/0858 701/33.3 |

FOREIGN PATENT DOCUMENTS

| | | |
|---|---|---|
| DE | 102004003294 A1 | 8/2005 |
| DE | 102006028625 A1 | 10/2007 |
| DE | 102009028644 A1 | 2/2011 |
| EP | 1475765 A2 | 11/2004 |
| JP | 2002310697 A | 10/2002 |
| JP | 2011060113 A | 3/2011 |
| WO | 2007108354 A1 | 9/2007 |
| WO | 2013165989 A2 | 11/2013 |

OTHER PUBLICATIONS

U.S. Appl. No. 14/067,316, entitled "System for Determining Clearance of Approaching Overhead Structure", filed Oct. 30, 2013, 30 pages.
Great Britain Combined Search and Examination Report for Application No. GB1601526.5, Feb. 25, 2016, 8 pages.
Great Britain Examination Report for Application No. GB1419195.1, Feb. 25, 2016, 4 pages.
Great Britain Combined Search and Examination Report for Application No. GB1419195.1, Apr. 30, 2015, 6 pages.
Garmin, "dezl 760 Owner's Manual", Nov. 2012, Garmin Ltd.
International Search Report for Application No. PCT/US2015010311, Mar. 2, 2015, 10 pages.

* cited by examiner

APPARATUS AND METHOD FOR ACTIVELY DETERMINING HEIGHT CLEARANCE AND GENERATING ALERTS

TECHNICAL FIELD

Aspects of the present disclosure provide an apparatus and method for actively determining height clearance and generating alerts within a vehicle.

BACKGROUND

Various strategies for determining height clearance have been developed. An overhead clearance detection system and method may include a sensor for measuring a distance to an object. A vertical height for the object may be determined and compared to a user defined clearance height. If the object's vertical height is less than the user defined clearance height, an alarm may be sounded. The system may be removably mountable to a vehicle windshield.

Another approach uses a device for attaching directly to a high-profile and/or elongated item of cargo transported on the exterior payload area of a vehicle to prevent collisions with obstructions. A detector remotely detects a distant obstruction in the path of the cargo using ultrasonic, infrared, or other sensing techniques. The detector is mounted directly to the cargo by a mounting member that releasably surrounds at least a portion of the cargo and provides an enveloping, frictionally constricting engagement to maintain the detector in a preferred operating orientation. The mounting member preferably includes a bracket configured to attach at multiple, spaced points on the cargo. In one alternative configuration, the mounting member comprises a flexible membrane which wraps around a portion of the cargo and is securely held in position thereto using tension straps. Alarm features include a light source and speaker contained in a passenger compartment and activated whenever the detector senses an obstruction in the path of the cargo. The detector and alarm components can communicate via an electrical cable, or using wireless transmission.

SUMMARY

In at least one embodiment, an apparatus includes a controller electrically coupled to a first sensor positioned on a first object external to a vehicle. The controller is configured to receive first information indicative of a height of the first object from the first sensor via Bluetooth Low Energy (BLE) and to store second information corresponding to a height of the vehicle. The controller is further configured to receive third information corresponding to a height of overhead obstacle positioned external to the vehicle and to compare at least one of the first information and the second information to the third information. The controller is further configured to generate an alert based on the comparison of the at least one of the first information and the second information to the third information.

In at least another embodiment a method is provided that comprises electrically receiving, via BLE, first information indicative of a height of an object from a sensor positioned on the object that is external to a vehicle and electrically storing second information corresponding to a height of the vehicle. The method further includes electrically receiving third information corresponding to a height of an overhead obstacle positioned away from the vehicle and electrically comparing at least one of the first information and the second information to the third information. The method further includes electrically generating an alert based on the comparison of the at least one of the first information and the second information to the third information.

In at least another embodiment, an apparatus including a controller is provided. The controller is configured to receive via Bluetooth Low Energy (BLE), first information indicative of a height of a first object from a first sensor positioned on the first object that is external to a vehicle and to receive via BLE, second information of a height of a second object from a second sensor positioned on the second object that is external to the vehicle. The controller is further configured to compare the first information to the second information.

BRIEF DESCRIPTION OF THE DRAWINGS

The embodiments of the present disclosure are pointed out with particularity in the appended claims. However, other features of the various embodiments will become more apparent and will be best understood by referring to the following detailed description in conjunction with the accompany drawings in which:

DETAILED DESCRIPTION

Figure 1:
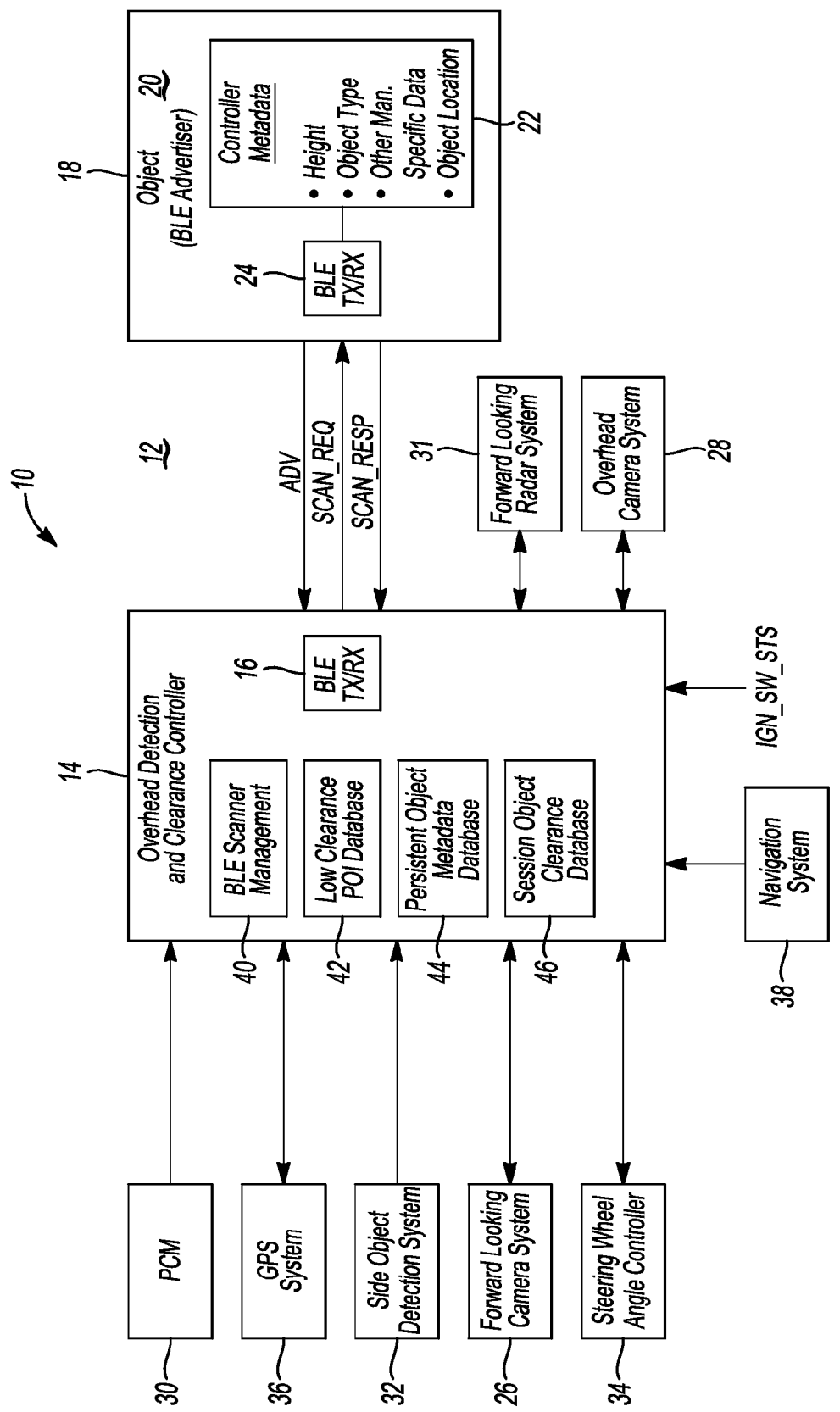
FIG. 1 depicts an apparatus for actively determining height clearance and generating alerts within a vehicle in accordance to one embodiment.

As required, detailed embodiments of the present invention are disclosed herein; however, it is to be understood that the disclosed embodiments are merely exemplary of the invention that may be embodied in various and alternative forms. The figures are not necessarily to scale; some features may be exaggerated or minimized to show details of particular components. Therefore, specific structural and functional details disclosed herein are not to be interpreted as limiting, but merely as a representative basis for teaching one skilled in the art to variously employ the present invention.

The embodiments of the present disclosure generally provide for a plurality of circuits or other electrical devices. All references to the circuits and other electrical devices and the functionality provided by each, are not intended to be limited to encompassing only what is illustrated and described herein. While particular labels may be assigned to the various circuits or other electrical devices disclosed, such labels are not intended to limit the scope of operation for the circuits and the other electrical devices. Such circuits and other electrical devices may be combined with each other and/or separated in any manner based on the particular type of electrical implementation that is desired. It is recognized that any circuit or other electrical device disclosed herein may include any number of microprocessors, integrated circuits, memory devices (e.g., FLASH, random access memory (RAM), read only memory (ROM), electrically programmable read only memory (EPROM), electrically erasable programmable read only memory (EEPROM), or other suitable variants thereof) and software which co-act with one another to perform operation(s) disclosed herein. In addition, any one or more of the electric devices may be configured to execute a computer-program that is embodied in a non-transitory computer readable medium that is programmed to perform any number of the functions as disclosed.

It is common for vehicles operators to stow items on top of vehicles to expand the stowage capacity of their vehicles. For example, travelers may place a cargo carrier on top of their vehicles to accommodate additional luggage (e.g., see FIG. 3). Others may use a roof top mounted bicycle rack to transport their bicycles (e.g., see FIG. 2). This is becoming more common as vehicles continue to downsize to improve fuel economy or when the cargo area is replaced by a battery for electric vehicles.

A vertical height of the vehicle may refer to the vertical clearance of the vehicle, which is the elevation of an overhead object that a vehicle can safely pass under (e.g. bridge, garage, etc.). Vertical clearance is affected by cargo stowed on a rooftop of the vehicle. This condition may present a problem when a driver forgets about the cargo and attempts to pass under an external overhead obstacle (e.g., overhead bridge, extended roof top, etc.) that the vehicle could typically clear unobstructed. In one example, a collision resulting in damage could occur if the driver attempts to park in a garage or pass under the extended rooftop of a drive thru window.

The embodiments provided herein disclose an apparatus and method to automatically detect external cargo or a trailer and to calculate the adjusted clearance to actively monitor and alert the driver when an external overhead obstacle is detected in the projected path of the vehicle. The apparatus and method utilize Bluetooth Low Energy (BLE) for wireless communication between a controller, including a scanner, in the vehicle and an advertiser positioned in a sensor on the object for purposes of actively determining height clearance and generating alerts within a vehicle. One example of an apparatus that utilizes BLE communication in a vehicle setting is set forth in International Publication No. PCT/US2015/10311 filed on Jan. 6, 2015 to Miller et al. which is hereby incorporated by reference in its entirety. One advantage of the advertiser/scanner relationship as set forth herein is that neither device has to be electronically paired and connected to authorize communication between the devices.

The BLE advertiser/scanner interface described above can be applied to the automotive environment to facilitate the apparatus and method for detecting external cargo or trailers wirelessly and automatically. A BLE based transceiver may be attached to the cargo or trailer and function in the advertiser role within the BLE environment. Such a transceiver may then advertise a set of data including, but not limited to, height and cargo type that includes data to associate the object with the vehicle and allows for proper clearance determination. Likewise, another BLE based transceiver may be positioned in the vehicle and function in the scanner role within the BLE environment. This vehicle transceiver may receive advertisements from transceiver(s) positioned on the external cargo or trailers and process the received data. Then, while driving, the vehicle may alert the driver of a dangerous low clearance situation. A vehicle controller may also need to be programmed at the factory with the vehicle's clearance or by the customer, if the vehicle's height is modified. This aspect will be discussed in more detail below in connection with FIGS. 6A-6C.

FIG. 1 depicts an apparatus 10 for actively determining height clearance and generating alerts within a vehicle 12 in accordance to one embodiment. The apparatus 10 includes an overhead detection and clearance controller (or controller) 14 that is configured to alert the driver in response to determining that the overall height of the vehicle and an object 20 (positioned with or on the vehicle) may contact an external overhead obstacle (e.g., highway overpass, extended rooftop of a drive through, low level parking garage, etc.). A BLE based transceiver (or transceiver) 16 is electrically coupled to the controller 14. It is recognized that the transceiver 16 may be positioned either internal to the controller 14 or external to the controller 14.

A sensor 18 is positioned on the object 20 that is external to the vehicle 12. For example, the object 20 may be, but not limited to a bike, trailer, exterior storage compartment positioned on the vehicle 12, etc. The sensor 18 also includes a controller 22 and a BLE based transceiver 24 to enable communication with the transceiver 16 on the vehicle 12 (or to enable communication with the vehicle 12). The controller 22 and the transceiver 24 may be defined as an advertiser in the BLE environment. The controller 14 and the transceiver 16 may be defined as a scanner in the BLE environment. In general, the controller 22 is configured to actively monitor for the sensor 18 in response to a signal IGN_SW_STS indicating that an engine of the vehicle 12 in in RUN. For example, the controller 14 monitors for a signal ADV (or advertisement signal) from each object 20 that may be attached to the vehicle 12. The signal ADV generally serves as a beacon signal from the sensor 18. For example, in response to receiving the signal ADV from the sensor 18, the controller 14 detects the presence of the sensor 18 and may then transmit a signal SCAN_REQ to the sensor 18 on the object 20. In this case, the signal SCAN_REQ corresponds to a request for information (or metadata request) from the sensor 18. Such information may include a request corresponding to the type of the object 20, an overall height of the object 20, manufacturer specific data, and location of the object 20 relative to the vehicle 12. The sensor 18 may then transmit the metadata data that includes the type of object 20 (e.g., cargo, trailer, etc.) the overall height of the object 20, manufacturer specific data, and the location of the object 20 relative to the vehicle 12. The manufacturer specific data may include, but not limited to, name of manufacturer (i.e., of the object 20), designated name of the object 20 (e.g., bike, external storage compartment, bike rack, etc.), a unique identification (or ID) for the object 20, etc. It is recognized that a user (or driver) has the capability of programming the sensor 18 to provide the metadata such as the overall height of the object 20, manufacturer specific data, and the location of the object relative to the vehicle 12. These aspects will be discussed in more detail below.

The vehicle 12 generally includes various systems that interface with the controller 14 to provide information related to the height of the generally stationary structures as noted above. For example, the vehicle 12 includes a forward looking camera system 26 that is arranged to provide information regarding the overall height of the external overhead obstacle to the controller 14 when the vehicle 12 is a predetermined distance away from the external overhead obstacle. The controller 14 may then compare the vertical height of the vehicle 12 and the overall height of the object 20 to the overall height of the external overhead obstacle to determine if there is adequate clearance for the vehicle 12 to pass under the external overhead obstacle. If the clearance will not be adequate and a collision will occur based on the comparison, the controller 14 then issues an alert (e.g., audible and/or visual) to the driver to notify the driver to avoid the external overhead obstacle. If the clearance is adequate, no warnings or alerts are issued. Alternatively, a forward looking radar system 31 may be used in place of the forward looking camera 26 to provide information regarding the overall height of the external overhead obstacle to the vehicle 12.

An overhead camera system 28 may also be coupled to the controller 14. The overheard camera system 28 may capture images of the external overhead obstacle when the vehicle 12 is a predetermined distance away from the external overhead obstacle. The overhead camera system 28 further includes a controller (not shown) that is configured to provide the overall height of the external overhead obstacle to the controller 14. The controller 14 compares the same to the vertical height of the vehicle 12 and the overall height of the object 20 to determine if there is adequate clearance. As described above, the controller 14 may issue an alert or warning if the clearance is not adequate. If the clearance is adequate, no warnings or alerts are issued.

The vehicle 12 may include a powertrain control module (PCM) 30, a side object detection system 32 (or a side object radar system 32), and a steering wheel angle controller 34. The PCM 30 is configured to provide vehicle speed and/or transmission status of the vehicle 12 (e.g., the vehicle in Park, Reverse, Neutral, Driver, and Low). The PCM 30 is also configured to control the speed of the vehicle 12. The side object detection system 32 is configured to provide information corresponding to side objects that are detected on a side of the vehicle (e.g., left, right or, rear side of the vehicle 12). The steering wheel angle controller 34 is configured to provide the steering wheel angle of the vehicle 12. The controller 14 uses this information to calculate the projected path of the vehicle 12 in relation to its course with the external overheard obstacle and further uses the vehicle speed to determine the distance of the vehicle 12 away from the external overhead obstacle. Likewise, the controller 14 will not initiate overhead detection until the vehicle speed is in excess of a predetermined vehicle speed. The controller 14 uses the vehicle speed from the PCM 30 for this purpose. The controller 14 may also utilize the information from the side object detection system 32 to determine if there are external overhead obstacles that are located on either the right, left or rear sides of the vehicle 12.

The side object detection system 32 provides information corresponding to the overall height of the side external overhead object to the controller 14. The controller 14 uses this information along with the steering wheel angle and the vehicle speed to dynamically determine if there is adequate clearance based on its vertical height and the overall height of the object 20. This information may be particularly useful for sharp or sudden turns into a parking garage especially when the vehicle 12 turns and travels onto a ramp entrance of the parking structure where the overall clearance of an overhead of the parking entrance is low or alternatively when the clearance of the entrance of the parking garage decreases in relation to the incline of the ramp.

A GPS system 36 is electrically coupled to the controller 14. The GPS system 36 provides location information (or GPS coordinates) of the vehicle 12. Additionally, a navigation system 38 is electrically coupled to the controller 14. The navigation system 38 provides map data of various points of interest in addition to home destination information, etc. Such map data may also include information corresponding to external overhead obstacles and the corresponding heights of the external overhead obstacles that the vehicle 12 may encounter while traveling to the point of interest. The navigation system 38 may also allow a user to manually enter various locations on the map that includes an external overhead obstacle. The user may also manually enter the vertical height for the external overhead obstacle if known. This may be particularly useful for external overhead obstacles that may be located in or about a residence or residential area when GPS coordinates may not be available. The navigation system 38 may provide the height information of the external overhead obstacles to the controller for comparison to the overall height of the vehicle 12 and the overall height of the object 20.

The controller 14 also includes a BLE scanner manager circuit 40 that manages communication via BLE with respect to signals that are transmitted or received to and from the sensor 18, respectively. It is also recognized that the controller 22 on the sensor 20 as mounted on the object 20 is configured to manage communication via BLE with respect to signals that are transmitted or received to and from the vehicle 12, respectively. The controller 14 also includes a low clearance point of interest (POI) database 42, a persistent object metadata database 44, and a session object clearance database 46. These aspects will be discussed in more detail below.

Figure 2:
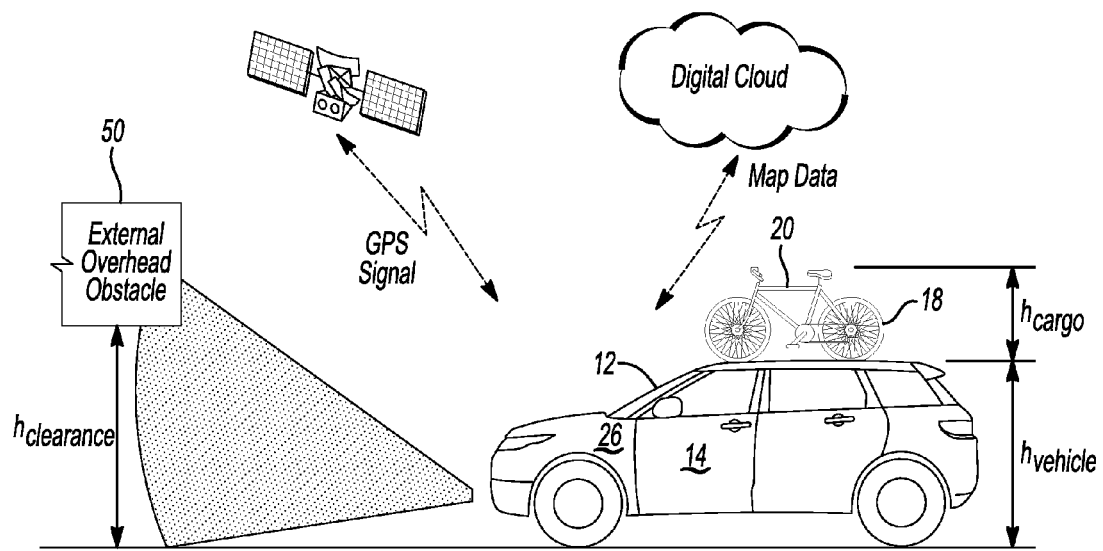
FIG. 2 depicts one example implementation for actively determining height clearance and generating alerts in accordance to one embodiment.

FIG. 2 depicts one example implementation for actively determining height clearance and generating alerts in accordance to one embodiment. As shown, the object 20 (or cargo) in this example is a bike that is mounted on a roof of the vehicle 12. The sensor 18 is mounted on the bike 20 and the sensor 18 provides the overall height of the bike 20 (i.e., $h_{cargo}$) to the controller 14. The controller 14 includes (or stores) information corresponding to the overall height of the vehicle 12 (i.e., $h_{vehicle}$). The controller 14 receives information corresponding to the overall height of an external overhead obstacle (or external overhead object) 50 (i.e., $h_{clearance}$) that is positioned a distance away from the vehicle 12. The controller 14 determines whether $h_{clearance} > h_{vehicle} + h_{cargo}$. If this condition is true, then the controller 14 determines that a collision will not occur between the vehicle 12 and the external overhead object 50. If this condition is false, then the controller 14 determines that a collision may occur between the vehicle 12 and/or the bike 20 with the external overhead object 50 and the controller 14 generates an alert to notify the driver in order to avoid the external overhead object 50. It is recognized that the vehicle 12 may optionally use the other systems noted in connection with FIG. 1 to determine the presence of the external overhead object 50 and to further obtain the height of the external overhead object 50.

Figure 3:
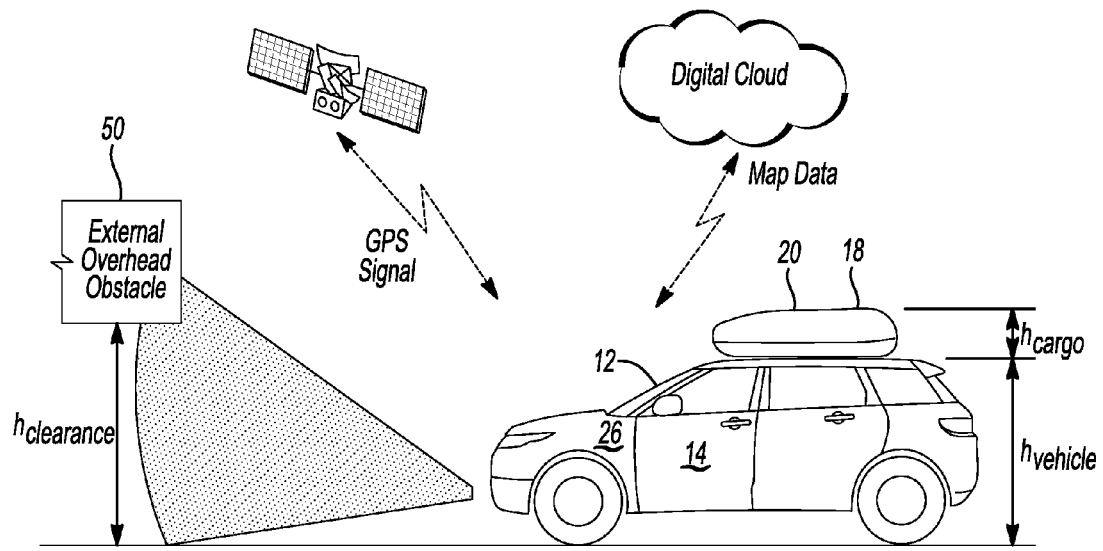
FIG. 3 depicts one example implementation for actively determining height clearance and generating alerts in accordance to one embodiment.

FIG. 3 depicts another example implementation for actively determining height clearance and generating alerts in accordance to one embodiment. As shown, the object 20 (or cargo) in this example is an exterior storage compartment that is mounted on a roof of the vehicle 12. The sensor 18 is mounted on the exterior storage compartment 20 and provides the overall height of the exterior storage compartment 20 (i.e., $h_{cargo}$) to the controller 14. The controller 14 determines whether $h_{clearance} > h_{vehicle} + h_{cargo}$. If this condition is true, then the controller 14 determines that a collision will not occur between the vehicle 12 and the external overhead object 50. If this condition is false, then the controller 14 determines that a collision may occur between the vehicle 12 and/or the exterior storage compartment 20 with the external overhead object 50 and the controller 14 generates an alert to notify the driver in order to avoid the external overhead object 50. It is recognized that the vehicle 12 may optionally use the other systems noted in connection with FIG. 1 to determine the presence of the external overhead object 50 and to further obtain the height of the external overhead object 50.

Figure 4:
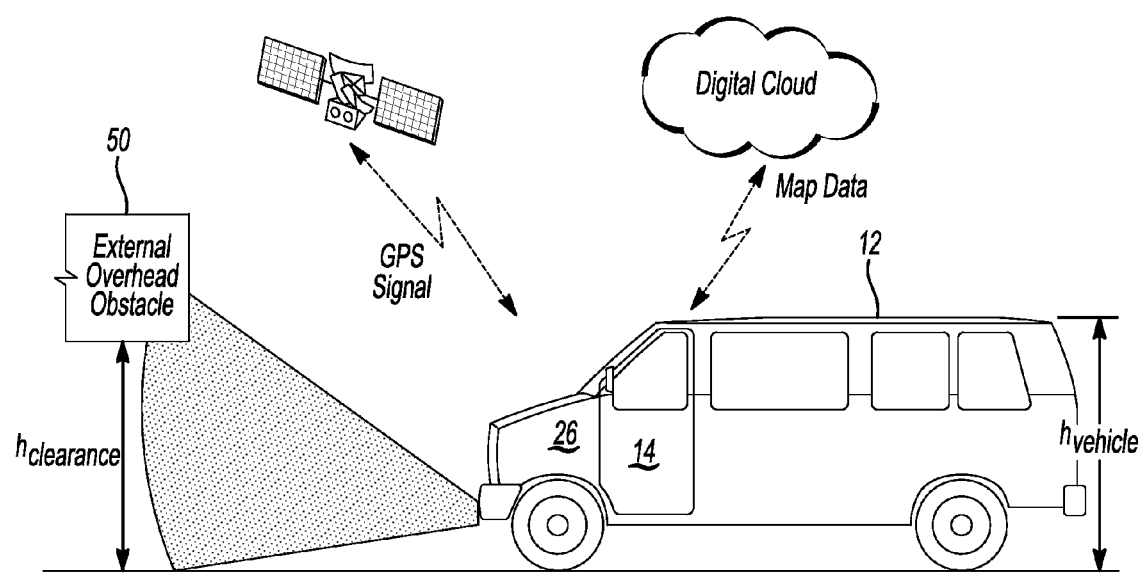
FIG. 4 depicts one example implementation for actively determining height clearance and generating alerts in accordance to one embodiment.

FIG. 4 depicts another example implementation for actively determining height clearance and generating alerts in accordance to one embodiment. As shown, there is no cargo or an object 20 is not present. However, in this example, the overall vertical height of the vehicle 12 $h_{vehicle}$ is greater than the vertical height of the vehicle 12 as shown in connection with FIGS. 2 and 3. In this example, the controller 14 determines whether $h_{clearance} > h_{vehicle}$. If this condition is true, then the controller 14 determines that a collision will not occur between the vehicle 12 and the external overhead object 50. If this condition is false, then the controller 14 determines that a collision may occur between the vehicle 12 and the external overhead object 50 and the controller 14 generates an alert to notify the driver in order to avoid the external overhead object 50. It is recognized that the vehicle 12 may optionally use the other systems noted in connection with FIG. 1 to determine the presence of the external overhead object 50 and to further obtain the height of the external overhead object 50.

Figure 5A:
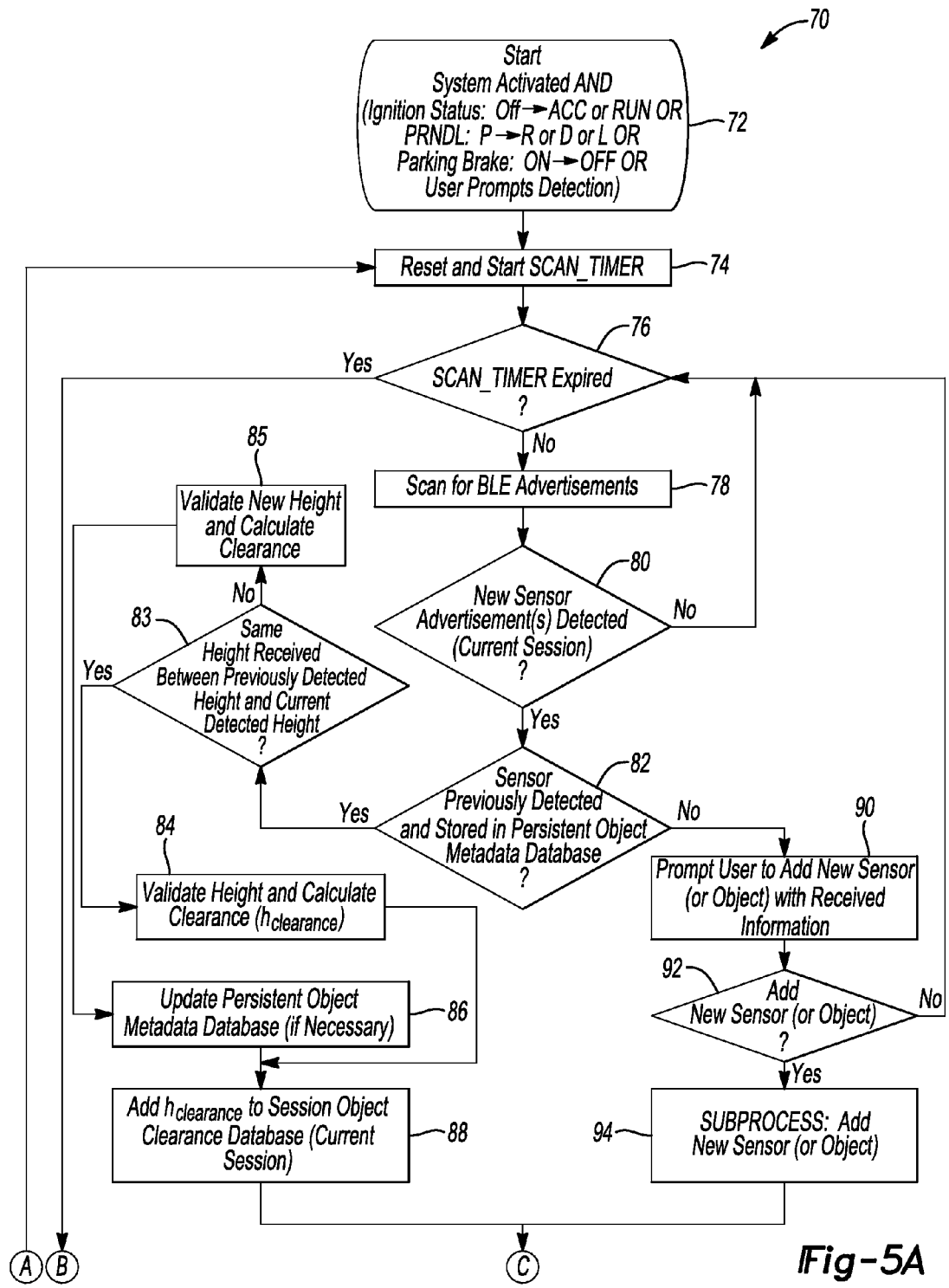
FIGS. 5A-5B depict a method for actively determining height clearance and generating alerts in accordance to one embodiment in accordance to one embodiment.
Figure 5B:
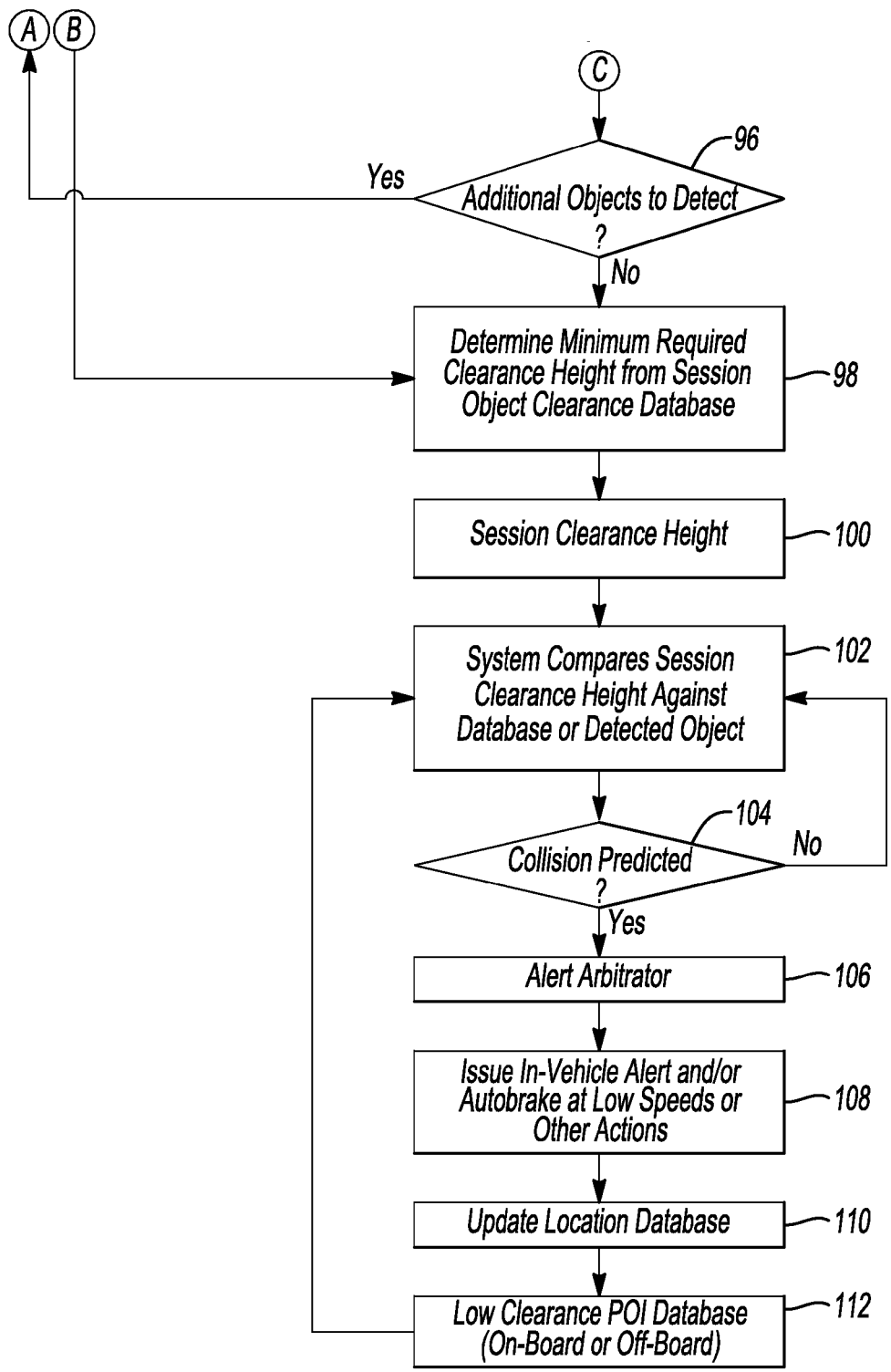

FIGS. 5A-5B depict a method 70 for actively determining height clearance and generating alerts in accordance to one embodiment in accordance to one embodiment.

In operation 72, the method 70 is initiated when the controller 14 (i) determines that ignition status has transitioned from OFF to ACC or RUN based on information included in the signal IGN_SW_STS, (ii) the transmission status transitions from Park, to Reverse, Drive, or Low, (iii) the parking brake transitions from On to Off, or (iv) vehicle speed exceeds a threshold. In another embodiment, the driver (or user) may initiate the method 70 via user selection through a graphical user interface (GUI) that is positioned in the vehicle 12. In this case, the noted conditions above (e.g., key status/transition, transmission status, parking brake status, and/or vehicle speed) may not be needed and the controller 14 will initiate the method 70 in response to the user selection.

In operation 74, the controller 14 resets and starts a timer (e.g., SCAN_TIMER). The controller 14 then determines whether the timer has expired at operation 76. If this condition is true, then the method 70 moves to operation 98. If not, the method 70 moves to operation 78. The timer aids in conserving power for the controller 14 and the transceiver 16. For example, the controller 14 and the transceiver 16 will monitor for signals from the sensor 18 (or object 20) for a predetermined amount of time and then go back to sleep if no signals have been received.

The controller 14 and the transceiver 16 (e.g., the scanner in the BLE environment) scan for an incoming signal (e.g., signal ADV) from the sensor 18 on the object 20 while the timer is active as indicated at operation 78. The controller 14 then determines whether it has received a signal ADV from the sensor 18 in its current drive cycle (or current session) at operation 80. If this condition is true, then the method 70 moves to operation 82. If not, then the method 70 moves back to operation 76.

In operation 82, the controller 14 determines whether the signal ADV corresponds to a previously received signal from the sensor 18. The signal ADV generally includes an ID which indicates the source of the transmitter (or the source of the sensor 18). The persistent object metadata database 44 electronically stores the ID for each signal ADV that was previously received at the controller 14. If the ID on the signal ADV as received in operation 80 matches a previously stored ID in the database 44, then the method 70 moves to operation 83. If not, then the method 70 moves to operation 90.

The controller 14 determines whether height as provided by the sensor 18 for the object 20 in operation 82 corresponds to, or is the same height that was previously received as represented by operation 83. For example, in the case the object 20 is positioned overhead of the vehicle 12, then the controller 14 receives the height of the object 20 from the sensor 18 and compares the height to a previously stored height of the object 20. If the values are different, then the controller 14 stores the recent value of the height of the object 20 in the session object clearance database 46 (see operation 88 below) (i.e., in the current session or current key cycle) and moves to operation 86.

Also by way of example, in the event the object 20 is not positioned overhead or on the vehicle 12, then the controller 14 receives the height of the object from the sensor 18 and compares the height to a previously stored height of the object 20. If the values are different, then the controller 14 stores the recent value of the height of the object 20 in the session object clearance database 46 (see operation 88 below) (i.e., in the current session or current key cycle). In addition, the controller 14 compares the new height of the object 20 to the height of the vehicle 12 and the controller 14 stores the maximum height between the two.

Thus, in view of the foregoing, if the controller 14 determines that the height as provided by the sensor 18 for the object 20 in operation 83 corresponds to, or is the same height that was previously received, then the method 70 moves to operation 84. If not, then the method 70 moves to operation 85.

In operation 84, the controller 14 validates the height for the object and the vehicle.

In operation 85, the controller 14 validates the height for the object 20 and the vehicle (i.e., whichever is greater) after determining that the height that was currently detected is different than a previously received height.

The controller 14 updates the persistent object metadata database 44 in the event a new height or location is provided for either the object 20 and/or the vehicle 12 in operation 86. The persistent object metadata database 44 assists the controller 14 in quickly recognizing the height of the objects 20. The new height of the object 20 may be accessible to the controller 14 in subsequent key ignition cycles. In operation 88, the controller 14 adds or electronically stores $h_{clearance}$ to the session object clearance database 46. The session object clearance database 46 stores the height(s) for a current key cycle. The session object clearance database 46 may clear the height(s) when the key cycles off.

In operation 90, the controller 14 may prompt the user to add new information corresponding to the newly detected sensor 18 (or the newly detected object 20). In operation 92, the new information is added to the controller 14 as will be described in more detail in connection with FIGS. 6A-6C.

The controller 14 adds and stores the new information for the new object 20 that is coupled to the vehicle 12 in operation 94. The controller 14 then monitors for signals from one or more additional sensors 18 that may be positioned on other objects 20 (or cargo or trailer) as represented by operation 96. If there are additional sensors 18, then the method 70 proceeds back to operation 74. If not, the method 70 proceeds to operation 98, where the controller 14 determines which object 20 while positioned on or with the vehicle 12 (i.e., if there are multiple objects 20) as stored in the session object clearance database 46) will provide for the maximum height. For example, the controller 14 determines the maximum height between all objects 20 and/or the vehicle 12

In operation 100, the controller 14 determines the minimum clearance amount for a detected external overhead obstacle (e.g., $h_{clearance}$), and then compares $h_{clearance}$ to the maximum height between all objects 20 and/or the vehicle 12 in operation 102. The controller 14 then determines whether a collision is expected or predicted based on whether $h_{clearance}$ is greater than the maximum height between all objects 20 and/or the vehicle 12 as represented by operation 104. If this condition is true, then the method 70 moves to operation 102 to determine the minimum clearance amount for the next detected external overhead obstacle. If this condition is false, then the method 70 moves to operation 106, where, the controller 14 activates an alert arbitrator to determine the manner in which to respond based on predicted collision time, etc.

In operation 108, the controller 14 generates an alert if there is adequate time for the driver to slow the vehicle down to avoid the collision. Alternatively, the controller 14 may transmit information to the PCM 30 to reduce speed automatically (e.g., selectively apply brakes, or auto brake) in the event the predicted collision time is less than a predetermined time value.

The controller 14 updates the low clearance POI database 42 if there is no information regarding the detected overhead obstacle in operation 110, and updates the low clearance POI database 42 with the location and minimum clearance amount (e.g., $h_{clearance}$) for the detected external overhead obstacle in operation 112.

Figure 6A:
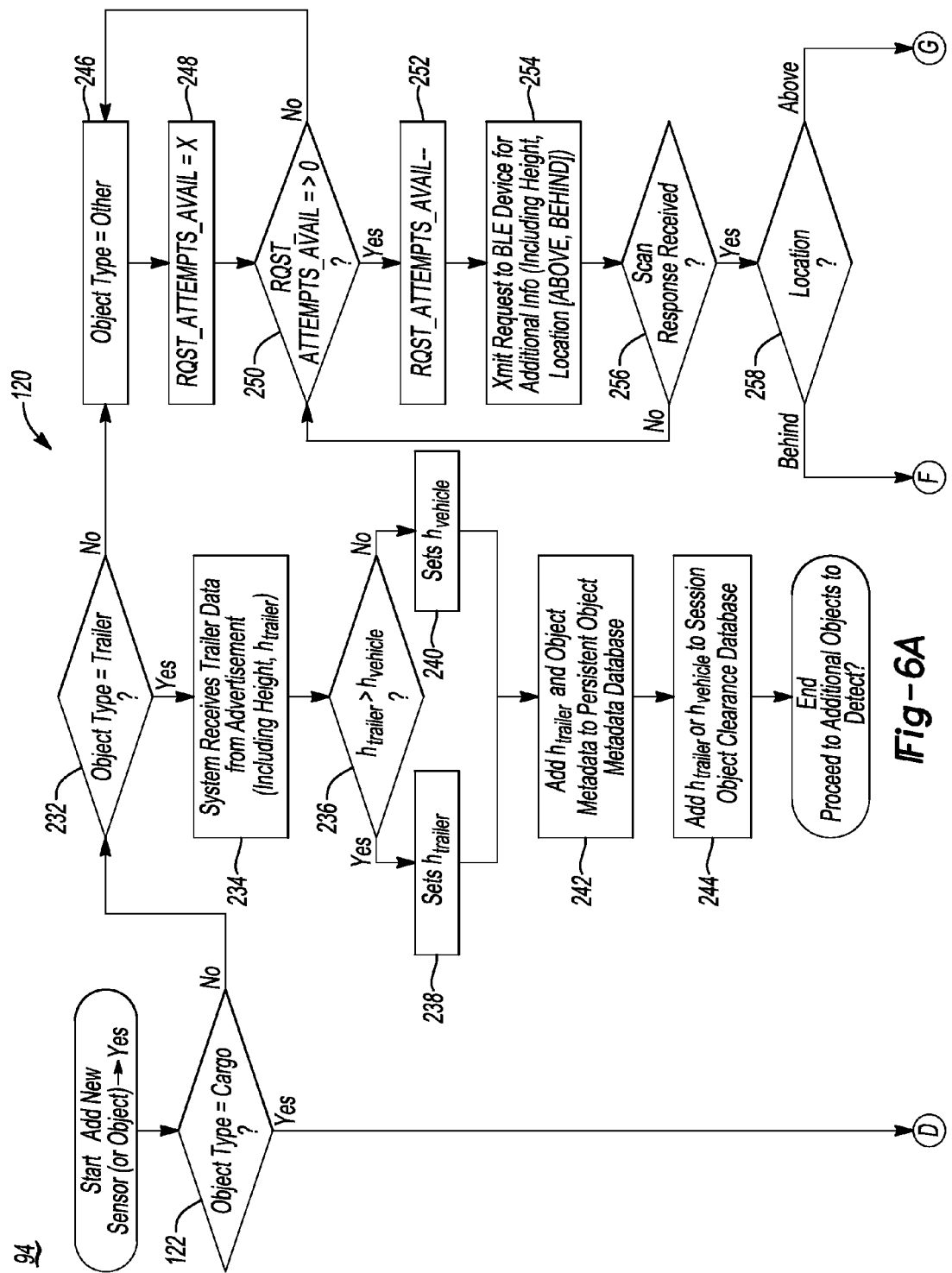
FIGS. 6A-6C depict a method for adding new information in connection with a new object that is positioned on or with the vehicle in accordance to one embodiment.
Figure 6B:
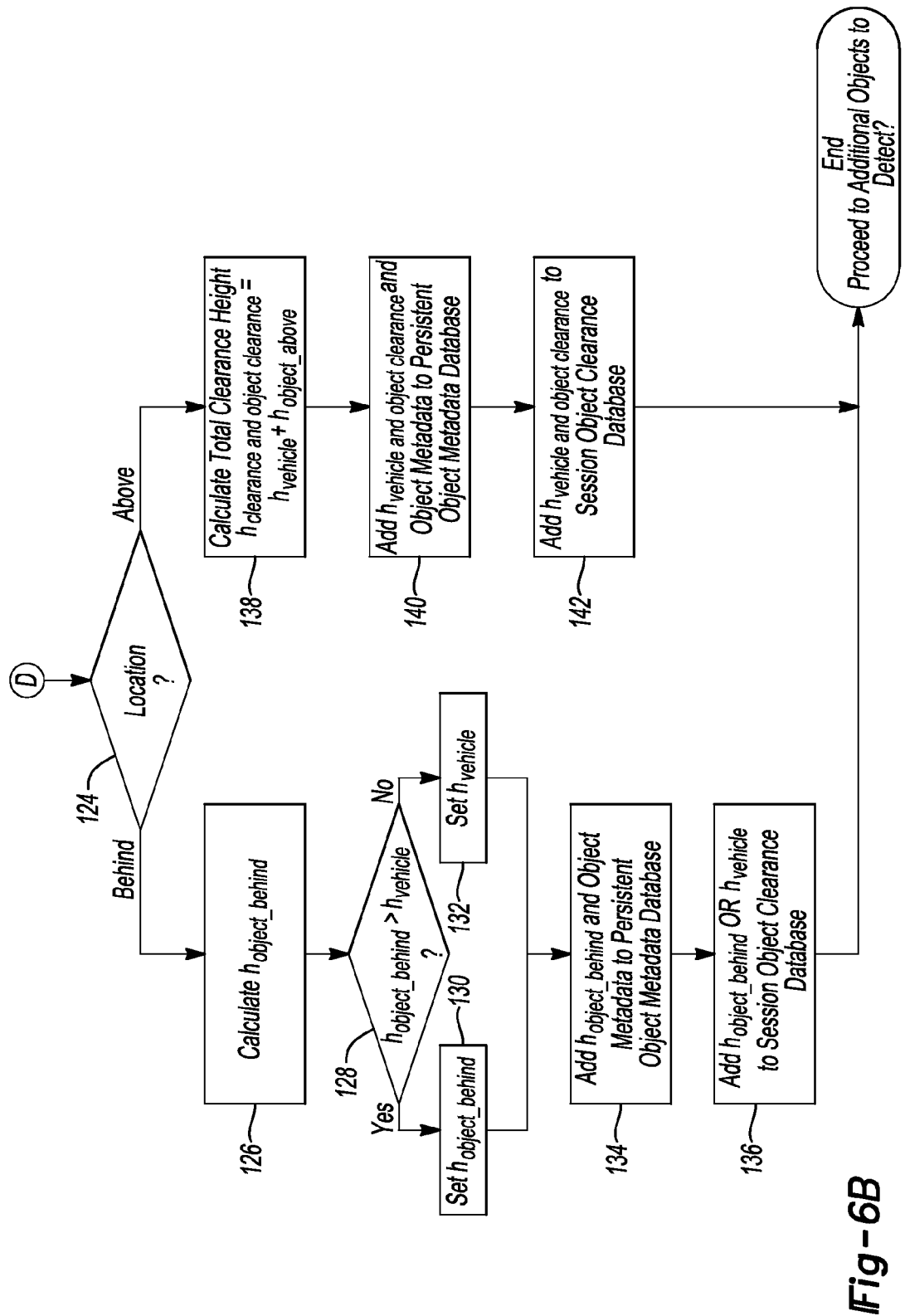
Figure 6C:
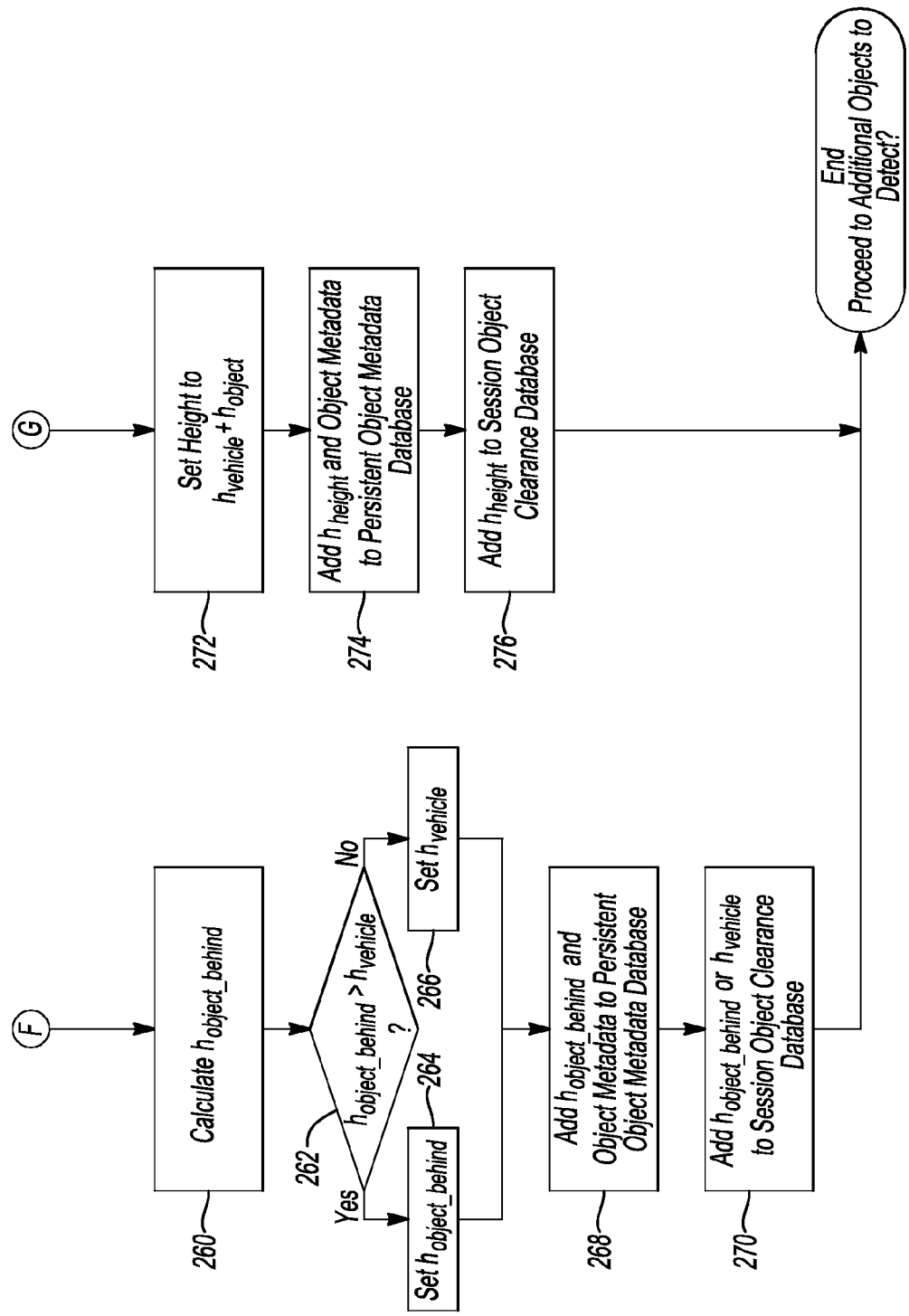

FIGS. 6A-6C depicts a method 120 (e.g., execution of operation 94) for adding new information in connection with a new object 20 that is positioned on or with the vehicle 12 in accordance to one embodiment.

In operation 122, the controller 14 determines whether the object 20 corresponds to cargo of some sort (e.g., bike, external storage compartment, etc.). As noted above, the sensor 18 provides the object type to the vehicle 12. If the object 20 corresponds to cargo, then the method 120 moves to operation 124. If not, then the method 120 moves to operation 232.

In operation 124, the controller 14 determines whether the object 20 is located behind or above the vehicle 12. If the object 20 is behind the vehicle 12, then the method 120 moves to operation 126. If the object 20 is above the vehicle 12, then the method 120 moves to operation 138.

In operation 126, the controller 14 calculates the height of the object that is behind the vehicle 12 (e.g., $h_{object\_behind}$).

In operation 128, the controller 14 determines whether $h_{object\_behind} > h_{vehicle}$. If this condition is true, then the method 120 moves to operation 130. If not, then the method 120 moves to operation 132.

In operation 130, the controller 14 sets $h_{vehicle\ and\ object\ clearance} = h_{object\_behind}$.

In operation 132, the controller 14 sets $h_{vehicle\ and\ object\ clearance} = h_{vehicle}$.

In operation 134, the controller 14 stores $h_{vehicle\ and\ object\ clearance}$ and the object metadata to the persistent object metadata database 44.

In operation 136, the controller 14 stores $h_{vehicle\ and\ object\ clearance}$ to the session object clearance database 46.

In operation 138, the controller 14 calculates $h_{vehicle\ and\ object\ clearance} = h_{vehicle} + h_{object\_above}$.

In operation 140, the controller 14 stores $h_{vehicle\ and\ object\ clearance}$ and the object metadata to the persistent object metadata database 44.

In operation 142, the controller 14 stores $h_{vehicle\ and\ object\ clearance}$ to the session object clearance database 46.

In operation 232, the controller 14 determines whether the object 20 corresponds to a trailer. As noted above, the sensor 18 provides the object type to the vehicle 12. If the object 20 corresponds to trailer 20, then the method 120 moves to operation 234. If not, then the method 120 moves to operation 246.

In operation 234, the controller 14 receives trailer information from the sensor 18 such as the overall height of the trailer 20 (e.g., $h_{trailer}$) and where the cargo is located relative to the vehicle 12.

In operation 236, the controller 14 determines whether $h_{trailer} > h_{vehicle}$. If this condition is true, then the method 120 moves to operation 238. If not, then the method 120 moves to operation 240.

In operation 238, the controller 14 sets $h_{vehicle\ and\ object\ clearance} = h_{trailer}$ as the height of the trailer is greater than that of the vehicle 12.

In operation 240, the controller 14 sets $h_{vehicle\ and\ object\ clearance} = h_{vehicle}$ as the height of the vehicle is greater than that of the trailer 20.

In operation 242, the controller 14 adds $h_{vehicle\ and\ object\ clearance}$ and the object metadata to the persistent object metadata database 44.

In operation 244, the controller 14 adds $h_{vehicle\ and\ object\ clearance}$ to the session object clearance database 46.

In operation 246, the controller 14 determines that the object 20 corresponds to "other." As noted above, the sensor 18 provides the object type to the vehicle 12. If the object type corresponds to "other" or something that is something that is not recognizable. This condition means that the object 20 cannot be recognized.

In operation 248, the controller 14 stores a predetermined value that corresponds to a number of request attempts that the controller 14 may utilize to request the object type from the sensor 18. This condition prevents the controller 14 (i.e., the transceiver 16) from continuously transmitting requests to the sensor 18 and minimizes power consumption.

In operation 250, the controller 14 determines the number of request attempts that are available for requesting the object type from the sensor 18 is greater than zero. If this condition is true, then the method 120 moves to operation 252. If not, then the method 120 moves into a failure mode and then exits.

In operation 252, the controller 14 determines that it can request the object type information again from the sensor 18, then transmits the signal SCAN_REQ to the sensor 18 and requests that sensor provide additional information such as height of the object, its location with respect to the vehicle (e.g., above and behind) in operation 254. The controller 14 receives the signal SCAN_RSP to provide the additional information from the sensor 18 in operation 256.

The controller 14 determines whether the object 20 is located behind or above the vehicle 12 in operation 258. If the object 20 is behind the vehicle 12, then the method 70 moves to operation 260. If the object 20 is above the vehicle 12, then the method 70 moves to operation 272.

In operation 260, the controller 14 calculates the height of the object that is behind the vehicle 12 (e.g., $h_{object\_behind}$). In operation 262, the controller 14 determines whether $h_{object\_behind} > h_{vehicle}$. If this condition is true, then the method 120 moves to operation 264. If not, then the method 120 moves to operation 266.

In operation 264, the controller 14 sets $h_{vehicle\ and\ object\ clearance} = h_{object\_behind}$.

In operation 266, the controller 14 sets $h_{vehicle\ and\ object\ clearance} = h_{vehicle}$.

In operation 268, the controller 14 stores $h_{vehicle\ and\ object\ clearance}$ and the object metadata to the persistent object metadata database 44.

In operation 270, the controller 14 stores $h_{vehicle\ and\ object\ clearance}$ to the session object clearance database 46.

In operation 272, the controller 14 calculates $h_{vehicle\ and\ object\ clearance} = h_{vehicle} + h_{object\_above}$.

In operation 274, the controller 14 stores $h_{vehicle\ and\ object\ clearance}$ and the object metadata to the persistent object metadata database 44.

In operation 276, the controller 14 stores $h_{vehicle\ and\ object\ clearance}$ to the session object clearance database 46.

While exemplary embodiments are described above, it is not intended that these embodiments describe all possible forms of the invention. Rather, the words used in the specification are words of description rather than limitation, and it is understood that various changes may be made without departing from the spirit and scope of the invention. Additionally, the features of various implementing embodiments may be combined to form further embodiments of the invention.

What is claimed is:

1. An apparatus comprising:
a memory device; and
a controller including the memory device and being electrically coupled to a first sensor positioned on a first object external to a vehicle, the controller being configured to:
receive first information indicative of a height of the first object from the first sensor via Bluetooth Low Energy (BLE);
store second information corresponding to a height of the vehicle;
receive third information corresponding to a height of an overhead obstacle positioned external to the vehicle;
compare at least one of the first information and the second information to the third information; and
generate an alert based on the comparison of the at least one of the first information and the second information to the third information,
wherein the controller is further configured to receive an advertisement signal including an identification for the first sensor via BLE prior to receiving the first information,
wherein the controller is further configured to determine whether the advertisement signal was previously received from the first sensor in a current drive cycle based on the identification, and
wherein the controller is further configured to prompt a user to add a second sensor for a second object and to provide additional information indicative of a second height for the second object in response to the controller determining that the advertisement signal was not previously received from the first sensor.

2. The apparatus of claim 1 wherein the first information is also indicative of at least one of an object type for the first object, a location of the first object in reference to the vehicle, and manufacturer specific data of the first object.

3. The apparatus of claim 1 wherein the controller is further configured to determine whether the height of the first object as currently received from the first sensor is equal to the height of the first object as previously received from the first sensor.

4. The apparatus of claim 3 wherein the controller is further configured to store the height of the first object as currently received from the first sensor in a persistent object metadata database for storage in a subsequent key ignition cycle.

5. The apparatus of claim 1 wherein the controller is further configured to receive at least side object information and steering wheel angle information to monitor for the overhead obstacle that is positioned on one of a left side, a right side, and a rear side of the vehicle.

6. The apparatus of claim 1 wherein the controller is further configured to receive via BLE, fourth information corresponding to a height of a second object that is positioned external to the vehicle.

7. The apparatus of claim 6 wherein the controller is further configured to compare the first information to the fourth information prior to comparing the at least one of the first information and the second information to the third information.

8. A method comprising:
electrically receiving, via Bluetooth Low Energy (BLE), first information indicative of a height of an object from a sensor positioned on the object that is external to a vehicle;
electrically storing second information corresponding to a height of the vehicle;
electrically receiving third information corresponding to a height of an overhead obstacle positioned away from the vehicle;
electrically comparing at least one of the first information and the second information to the third information;
electrically generating an alert based on the comparison of the at least one of the first information and the second information to the third information;
receiving an advertisement signal including an identification for the sensor via BLE prior to receiving the first information;
determining whether the advertisement signal was previously received from the sensor in a current drive cycle based on the identification;
determining whether the height of the object as currently received from the sensor is equal to the height of the object as previously received from the sensor; and
storing the height of the object as currently received from the sensor in a persistent object metadata database for storage and retrieval in a subsequent key ignition cycle.

9. The method of claim 8 wherein the first information is also indicative of at least one of an object type for the object, a location of the object in reference to the vehicle, and manufacturer specific data of the object.

10. The method of claim 8 further comprising electrically prompting a user to add a first sensor for a first object and to provide additional information indicative of a first height for the first object in response to determining that the advertisement signal was not previously received from the sensor.

11. The method of claim 8 further comprising electrically receiving at least side object information and steering wheel angle information to monitor for the overhead obstacle that is positioned on one of a left side and a right side of the vehicle.

* * * * *